US012416376B2

(12) United States Patent
Ashok (10) Patent No.: US 12,416,376 B2
(45) Date of Patent: Sep. 16, 2025

(54) METHOD OF ASSEMBLING A CLAMP TO A FLEXIBLE HOSE FOR A VEHICLE, AND A CLAMPING ARRANGEMENT

(71) Applicant: Volvo Truck Corporation, Gothenburg (SE)

(72) Inventor: Pavan Ashok, Bengaluru (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/298,679

(22) Filed: Apr. 11, 2023

(65) Prior Publication Data

US 2023/0392725 A1    Dec. 7, 2023

(30) Foreign Application Priority Data

Jun. 6, 2022   (EP) .................................. 22177357.5

(51) Int. Cl.
*F16L 33/08* (2006.01)
*F16L 37/00* (2006.01)

(52) U.S. Cl.
CPC ............. *F16L 33/08* (2013.01); *F16L 37/004* (2013.01)

(58) Field of Classification Search
CPC ......... F16L 23/003; F16L 23/08; F16L 33/08; F16L 37/004; F16L 33/04
See application file for complete search history.

(56) References Cited

U.S. PATENT DOCUMENTS

| 2,793,057 | A | * | 5/1957 | Mcgugin | ............... | F16L 37/004 |
| | | | | | | 285/918 |
| 5,927,759 | A | | 7/1999 | Hyslop | | |
| 10,571,059 | B2 | | 2/2020 | Bowater et al. | | |
| 2005/0052018 | A1 | * | 3/2005 | Pichotta | ................ | F16L 37/004 |
| | | | | | | 285/9.1 |
| 2009/0293238 | A1 | * | 12/2009 | Davis | .................... | H01F 7/0242 |
| | | | | | | 24/303 |
| 2013/0276923 | A1 | * | 10/2013 | Wolff | ...................... | F16L 37/32 |
| | | | | | | 285/1 |
| 2019/0285309 | A1 | | 9/2019 | Raeburn | | |

FOREIGN PATENT DOCUMENTS

| CN | 202852325 U | 4/2013 |
| CN | 210398063 U | 4/2020 |
| CN | 213809381 U | 7/2021 |

OTHER PUBLICATIONS

Extended European Search Report for European Patent Application No. 22177357.5, mailed Nov. 16, 2022, 5 pages.

* cited by examiner

*Primary Examiner* — Zachary T Dragicevich
*Assistant Examiner* — James A Linford
(74) *Attorney, Agent, or Firm* — Withrow & Terranova, PLLC (57) ABSTRACT

A method of assembling a clamp to a flexible hose for a vehicle. The method comprises providing the hose with a magnetic strip such that the magnetic strip has its main direction of extension in a circumferential direction of the hose; providing a clamp to the hose, at least a part of the clamp being magnetically attracted by the magnetic strip so that the part of the clamp becomes aligned with the magnetic strip along the circumferential direction of the hose; and tightening the clamp to the hose when the clamp has become aligned with the magnetic strip. The disclosure also relates to a clamping arrangement.

18 Claims, 6 Drawing Sheets

METHOD OF ASSEMBLING A CLAMP TO A FLEXIBLE HOSE FOR A VEHICLE, AND A CLAMPING ARRANGEMENT

RELATED APPLICATIONS

The present application claims priority to European Patent Application No. 22177357.5, filed on Jun. 6, 2022, and entitled "METHOD OF ASSEMBLING A CLAMP TO A FLEXIBLE HOSE FOR A VEHICLE, AND A CLAMPING ARRANGEMENT," which is incorporated herein by reference in its entirety.

TECHNICAL FIELD

The present disclosure relates to a method of assembling a clamp to a flexible hose for a vehicle. The present disclosure also relates to a clamping arrangement. Furthermore, the present disclosure relates to a vehicle comprising such a clamping arrangement.

The general inventive concept can be applied in heavy-duty vehicles, such as trucks, buses and construction equipment. Although the present disclosure will focus on a heavy-duty vehicle, the general inventive concept is not restricted to this particular vehicle, but may also be used in other vehicles such as cars.

BACKGROUND

Modern vehicles are generally assembled in factories along assembly lines. Different subsystems may be mounted at different stations. One such subsystem may be a coolant system of the vehicle. When mounting the coolant system, for instance, flexible hoses of the coolant system are connected by means of clamps. However, in an assembly line it may be difficult to assemble the clamps in the desired orientation without using any marking or any indication.

A worker will often position the clamp in a different orientation and tighten the clam with the stipulated torque. After some time or in dynamic conditions, the torque will become reduced and the clamp may loosen from its original position. This may lead to coolant leakage in the coolant system.

If the clamps are mounted straight and correctly aligned to the hoses, it will be easier for the workers to tighten the clamp with adequate speed and torque, and reduce the risk of subsequent loosening and leakage. An obvious solution to this is to provide some marking or indication on the hose to help guiding the workers so that they apply the clamps with the correct orientation relative to the hoses. However, human error may still happen, the marking may be overlooked or ignored, and the clamps may therefore sometimes still be incorrectly mounted. Thus, there is still room for improvement.

SUMMARY

An object of the general inventive concept is to provide a method and a clamping arrangement which at least partly alleviates the drawbacks of the prior art. This and other objects, which will become apparent in the following discussion, are accomplished by a method and a clamping arrangement as defined in the accompanying independent claims. Some non-limiting exemplary embodiments are presented in the dependent claims.

The inventor of the general inventive concept has realized that an improved alignment of a clamp with a hose is achievable by having the clamp magnetically aligned to the correct position. In particular, the inventor has realized that by appropriate application of one or more magnets to a hose, the clamp will become attracted by the magnet and aligned in the correct orientation, after which a worker may tighten the clamp with the adequate speed and torque to obtain a reliable hose connection.

According to a first aspect of the present disclosure there is provided a method of assembling a clamp to a flexible hose for a vehicle, the method comprising:

providing the hose with a magnetic strip such that the magnetic strip has its main direction of extension in a circumferential direction of the hose, providing a clamp to the hose, at least a part of the clamp being magnetically attracted by the magnetic strip so that said part of the clamp becomes aligned with the magnetic strip along the circumferential direction of the hose, and tightening the clamp to the hose when the clamp has become aligned with the magnetic strip.

By placing the magnetic strip such that it has its main direction of extension in a circumferential direction of the hose, the clamp will, due to the magnetic attraction, become aligned in the circumferential direction, and thus correctly oriented relative to the hose without risking a skewed orientation, and thereby reducing the risk of later loosening of the clamp and leakage of fluid contained in the hose. Thus, the general inventive concept reduces the risk of human error and therefore also the consequences thereof.

According to at least one exemplary embodiment said part of the clamp which is magnetically attracted may be a circumferentially extending part. According to at least one exemplary embodiment, the width of said part may substantially correspond to the width of the magnetic strip. These features are advantageous for improving the desired aligning of the clamp.

According to at least one exemplary embodiment, the clamp comprises a band part and a screw part, wherein turning of the screw part in one direction causes tightening of the band part, while turning of the screw part in the opposite direction causes loosening of the band part. According to at least one exemplary embodiment the band part is said part that is magnetically attracted to the magnetic strip. However, it is also conceivable that the screw part or some other part be magnetically attracted. The width of the band part and the width of the magnetic strip may suitably be of substantially the same dimension.

According to at least one exemplary embodiment, the step of providing the hose with a magnetic strip comprises sandwiching the magnetic strip between two material layers of the hose. By sandwiching the magnetic strip, it will become well protected and well fixated reducing any risk of the magnetic strip loosening.

The material of the hose may, for instance, include a fabric and a rubber material, such as EPDM rubber (ethylene propylene diene monomer rubber). Although synthetic rubber, such as EPDM may be preferred, the general inventive concept would also be applicable to hoses having natural rubber. Instead of, or in addition to, a rubber material the hose may comprise silicone. The hose may suitably be made as alternating cylindrical layers of fabric and EPDM/silicone, which are bounded to each other by means of adhesive. The magnetic strip may thus suitably be sandwiched between a fabric layer and an EPDM/silicone layer.

According to at least one exemplary embodiment, the step of providing the hose with a magnetic strip comprises attaching the magnetic strip to an outer surface of the hose.

This is advantageous form a manufacturing perspective, as the application of the magnetic strip can be readily done when the layers of the hose have been assembled. A wrapping may, if desired, be provided around the magnetic strip and the hose for further protection.

According to at least one exemplary embodiment, the step of providing the hose with a magnetic strip comprises attaching the magnetic strip to an inner surface of the hose. By attaching the magnetic strip to an inner surface of the hose, the magnetic strip can be applied already during the initial process of forming the layers of the hose. The magnetic strip may be provided on a mandrel (or other tool) as the layers are formed around the mandrel (or other tool).

According to at least one exemplary embodiment, the step of providing the hose with a magnetic strip comprises embedding the magnetic strip within a material layer of the hose. By arranging the magnetic strip embedded in a material layer, such as when forming a rubber layer, the magnetic strip will be well protected.

A hose may be used to interconnect two pipe sections (or other hose sections). One end of the hose is connected to one of the pipe sections, the other end of the hose is connected to the other one of the pipe sections. The two pipe sections may be inserted into their respective ends of the hose, and in order to provide a firm connection, a clamp may be provided at each one of the ends of the hose to clamp the hose firmly to the respective pipe section. Accordingly, it should be understood that in at least some exemplary embodiments, the method comprises providing two clamps to the hose, each clamp having a part that is magnetically attracted by a respective magnetic strip so that the part becomes aligned with the respective magnetic strip along the circumferential direction of the hose, and then each clamp is tightened to the hose when the clamp has become aligned with the respective magnetic strip. The two magnetic strips may suitably be placed near the respective ends of the hose, wherein one clamp is provided at/near each end.

From the above, it should be understood that more than one magnetic strip may be applied to the hose. In the above, example, the two magnetic strips are applied separated from each other along the length of the hose. In case the hose is straight, the two magnetic strips are axially separated.

As will be explained below, it is conceivable to provide two or more magnetic strips which are separated from each other in the circumferential direction of the hose. Furthermore, even though they are circumferentially separated, they may be aligned in the length direction (i.e., axial direction for a straight hose) of the hose.

Thus, from the above it should be understood that although in some exemplary embodiments, a magnetic strip may form a full circle in the circumferential direction of the hose, in other exemplary embodiments it may form an arc of a circle. This is at least partly reflected in the following exemplary embodiment.

According to at least one exemplary embodiment, said magnetic strip is a first magnetic strip, the method further comprising:
    providing the hose with at least a second magnetic strip such that the second magnetic strip has its main direction of extension in the circumferential direction of the hose and such that the first and the second magnetic strips are spaced apart in the circumferential direction of the hose,
wherein said step of providing a clamp to the hose comprises said at least a part of the clamp being magnetically attracted by the first and second magnetic strips so that said part of the clamp becomes aligned with the first and the second magnetic strips along the circumferential direction of the hose.

By splitting the magnetic strip into several shorter magnetic strips, a higher flexibility is achieved for the hose, which may facilitate when mounting the hose to other pipes or any casted parts. From the above, it should be understood that said first and second magnetic strips may suitably define arcs of a common imaginary geometrical circle. In at least some exemplary embodiments there may be more than two, such as three, four or more magnetic strips defining arcs of a common imaginary geometrical circle.

According to a second aspect of the present disclosure there is provided a clamping arrangement, comprising:
    a flexible hose for a vehicle, and
    a clamp, wherein the clamp comprises a part which is magnetically attractable,
wherein the hose is provided with a magnetic strip which has its main direction of extension in a circumferential direction of the hose, wherein said part of the clamp is aligned with the magnetic strip along the circumferential direction of the hose, wherein the clamp is tightened to the hose.

The advantages of the clamping arrangement of the second aspect are largely analogous to the advantages of the method of the first aspect, including any exemplary embodiment thereof.

Below follows a number of non-limiting exemplary embodiments for the clamping arrangement of the second aspect. The various features and their advantages of these exemplary embodiments have already been discussed above in connection with exemplary embodiments of the method of the first aspect. Therefore, in order to keep this disclosure concise, such discussion will not be repeated here. It should nevertheless be understood that such discussion would be fully applicable to the various exemplary embodiments of the clamping arrangement of the second aspect.

Thus, according to at least one exemplary embodiment, the magnetic strip is sandwiched between two material layers of the hose.

According to at least one exemplary embodiment, the magnetic strip is attached to an outer surface of the hose.

According to at least one exemplary embodiment, the magnetic strip is attached to an inner surface of the hose.

According to at least one exemplary embodiment, the magnetic strip is embedded within a material layer of the hose.

According to at least one exemplary embodiment, said magnetic strip is a first magnetic strip, the clamping arrangement further comprising:
    at least a second magnetic strip which has its main direction of extension in the circumferential direction of the hose, wherein the first and the second magnetic strips are spaced apart in the circumferential direction of the hose, and wherein the clamp is aligned with the first and the second magnetic strips along the circumferential direction of the hose.

According to a third aspect of the present disclosure, there is provided a vehicle comprising a clamping arrangement according to the second aspect, including any embodiment thereof. The advantages of the vehicle of the third aspect are largely analogous to the advantages of the clamping arrangement of the second aspect, including any embodiment thereof.

Generally, all terms used in the claims are to be interpreted according to their ordinary meaning in the technical field, unless explicitly defined otherwise herein. All references to "a/an/the portion, element, apparatus, component, arrangement, device, means, etc." are to be interpreted openly as referring to at least one instance of the portion, element, apparatus, component, arrangement, device, means, etc., unless explicitly stated otherwise. Further features of, and advantages with, the teachings of the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION

The general inventive concept will now be described more fully hereinafter with reference to the accompanying drawings, in which certain aspects are shown. The general inventive concept may, however, be embodied in many different forms and should not be construed as limited to the embodiments and aspects set forth herein; rather, the embodiments are provided by way of example so that this disclosure will be thorough and complete, and will fully convey the scope to those skilled in the art. Accordingly, it is to be understood that the present general inventive concept is not limited to the embodiments described herein and illustrated in the drawings; rather, the skilled person will recognize that many changes and modifications may be made within the scope of the appended claims. Like reference numerals refer to like elements throughout the description.

Figure 1:
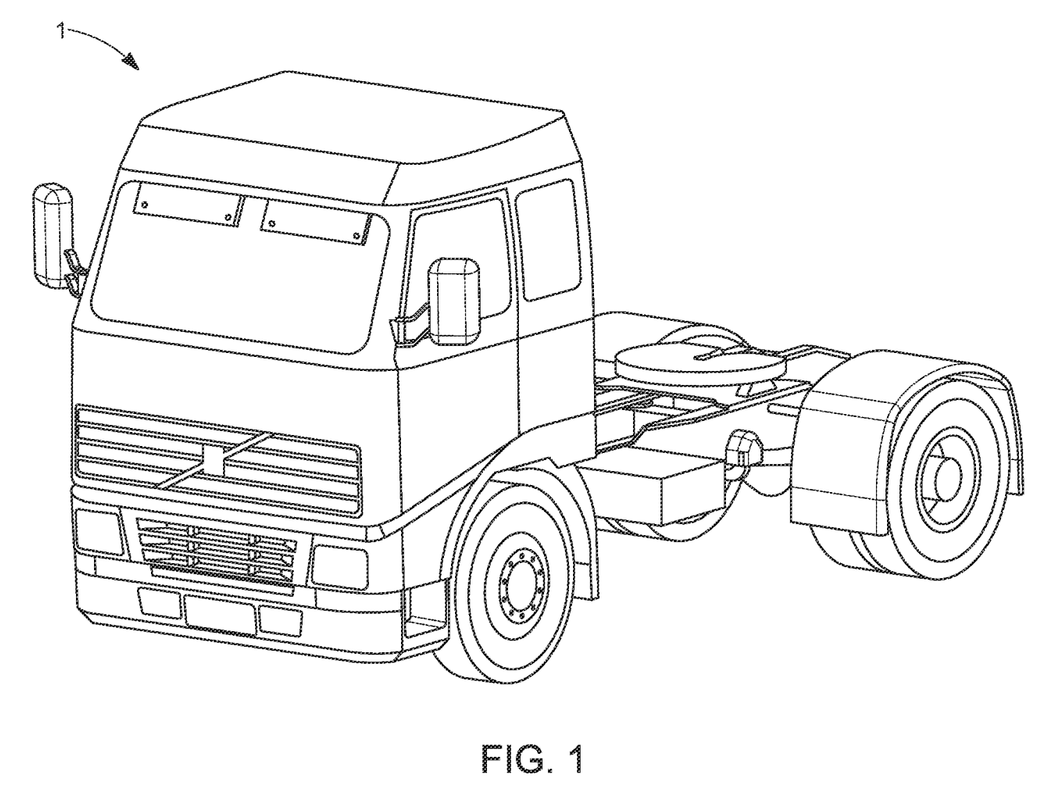
FIG. 1 illustrates a vehicle according to at least one exemplary embodiment of the present disclosure.

FIG. 1 illustrates a vehicle 1 according to at least one exemplary embodiment of the present disclosure. The exemplary illustration in FIG. 1 shows a heavy-duty vehicle 1. More specifically FIG. 1 shows a vehicle in the form of a tractor unit for towing a trailer unit (not shown), which together may make up a semitrailer vehicle. However, the teachings of the present disclosure are applicable to other types of vehicles as well. For instance, the vehicle may be a different type of vehicle for cargo transport, such as a truck, or a truck with a dolly unit arranged to tow a trailer unit, etc. Other exemplary vehicles include buses, construction equipment, and even passenger cars. The vehicle 1 may be operated by a driver or it may be an autonomous vehicle.

The vehicle 1 may comprise a clamping arrangement of the general inventive concept, some examples of which will be discussed in relation to the other drawing figures.

Figure 2:
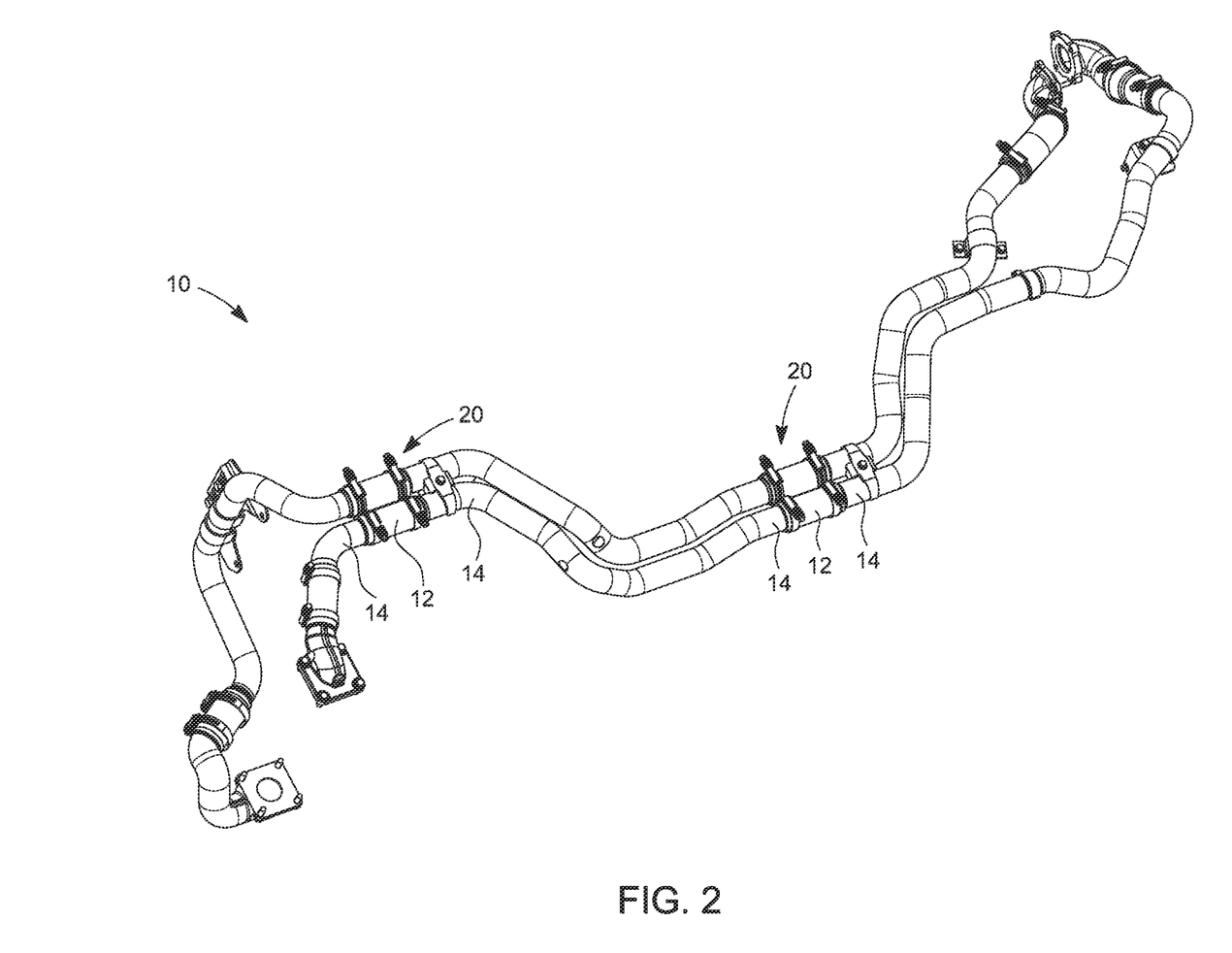
FIG. 2 illustrates a fluid conducting arrangement for a vehicle, such as for a coolant system, in which a clamping arrangement according to at least one exemplary embodiment may be implemented.

FIG. 2 illustrates a fluid conducting arrangement 10 for a vehicle, such as for a coolant system, in which a clamping arrangement 20 according to at least one exemplary embodiment may be implemented. Furthermore, clamps of the clamping arrangements 20 illustrated in FIG. 2 may be applied in accordance with the method of the present disclosure. The fluid conducting arrangement 10 may, for instance, be present in the vehicle 1 exemplified in FIG. 1.

As mentioned above, the fluid conducting arrangement 10 may form part of a coolant system. However, it should be understood that the general inventive concept may also be implemented for other subsystems of a vehicle which have fluid conducting arrangements in which there may be a desire to clamp a flexible hose.

As illustrated in FIG. 2, the fluid conducting arrangement 10 may at several locations be formed by a hose 12 interconnecting pipe sections 14 on either side of the hose 12. Near each end of the hose 12 a clamp of the clamping arrangement 20 has been tightened to form a firm connection between the hose 12 and the respective pipe section 14. The hoses 12 illustrated in FIG. 2 may be provided in accordance with any one of the exemplary embodiments of a clamping arrangement and/or assembling method discussed in connection with the rest of the drawing figures.

Figure 3A:
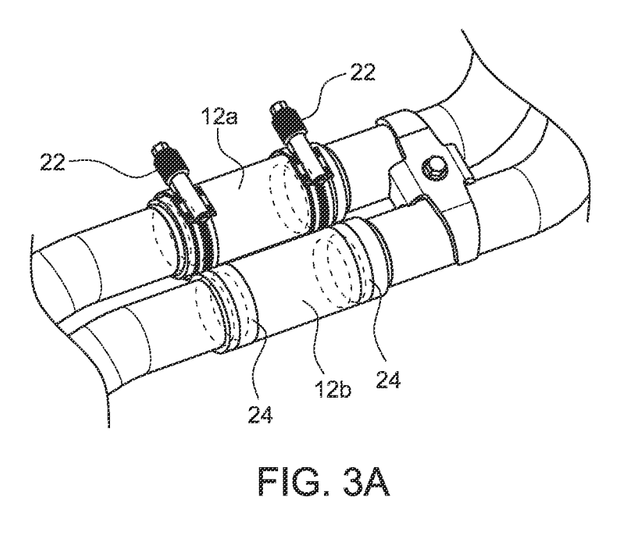
FIGS. 3A and 3B illustrate a clamping arrangement applied in accordance with at least one exemplary embodiment of the present disclosure.
Figure 3B:
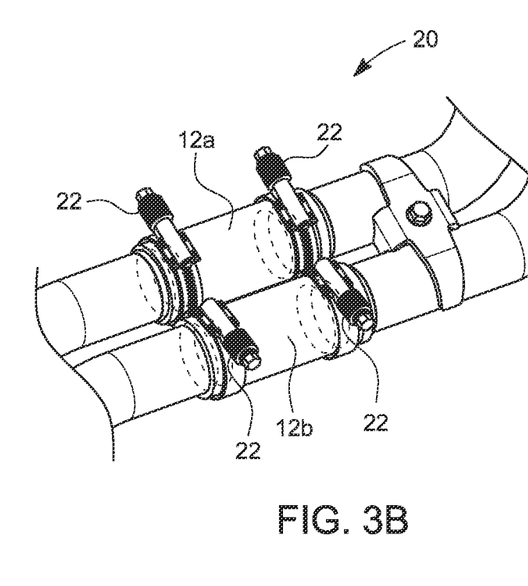

FIGS. 3A and 3B illustrate a clamping arrangement 20 applied in accordance with at least one exemplary embodiment of the present disclosure. FIG. 3A illustrates two flexible hoses, namely a first hose 12a and a second hose 12b. The first hose 12a may, for instance, represent a feed line, while the second hose 12b may represent a return line, or vice versa. The first hose 12a has already been provided with two clamps 22. The second hose 12b, however, has not yet received any clamps. FIG. 3A illustrates with solid lines that two magnetic strips 24 have been applied to an external surface of the second hose. With dashed lines it is indicated that a conceivable alternative would be to provide the magnetic strips internally of the hoses 12a, 12b (e.g., on an inner surface, embedded in a material layer, or sandwiched between two material layers). Each magnetic strip 24 may suitably form a full circle around the hose 12b, however, it is also conceivable to have shorter circumferential extensions for one or both of the magnetic strips 24. Thus, it should be understood that one or both of the magnetic strips 24 may define an arc of a circle. In either case, each magnetic strip 24 should have its main direction of extension along the circumferential direction of the hose 12b. In other words, for each magnetic strip 24, the circumferential extension is longer than the extension in the axial direction of the hose 12b. Thus, each magnetic strip 24, when having been applied to the hose 12b, may be considered to have a length (extending in the circumferential direction of the hose 12b), a width (being smaller than the length and extending in an axial direction of the hose 12b), and a thickness (being suitably smaller than the width and extending in the radial direction of the hose 12b). The magnetic strips 24 may suitably be attached to the hose 12b by means of adhesive.

FIG. 3B illustrates that clamps 22 have now also been applied to the second hose 12b. More specifically, after the second hose 12b has been provided with the magnetic strips 24 as in FIG. 3A, clamps 22 are provided to the second hose 12b. It should be understood that the corresponding procedure may suitably have been performed for the first hose 12a, i.e., first applying magnetic strips to the first hose 12a, and then providing the clamps 22 to the first hose 12a. At least a part of each clamp 22 is magnetically attracted by the respective magnetic strip 24 so that that part of the clamp 22 becomes aligned with the magnetic strip along the circumferential direction of the respective hose 12a, 12b. When the clamps 22 have become aligned with the magnetic strips 24, the clamps 22 are tightened to the hoses 12a, 12b, whereby the state illustrated in FIG. 3B is obtained. As will be understood in connection with FIG. 4, said magnetically attracted part of the clamp may suitably be a circumferentially extending part of the clamp 22.

Figure 4:
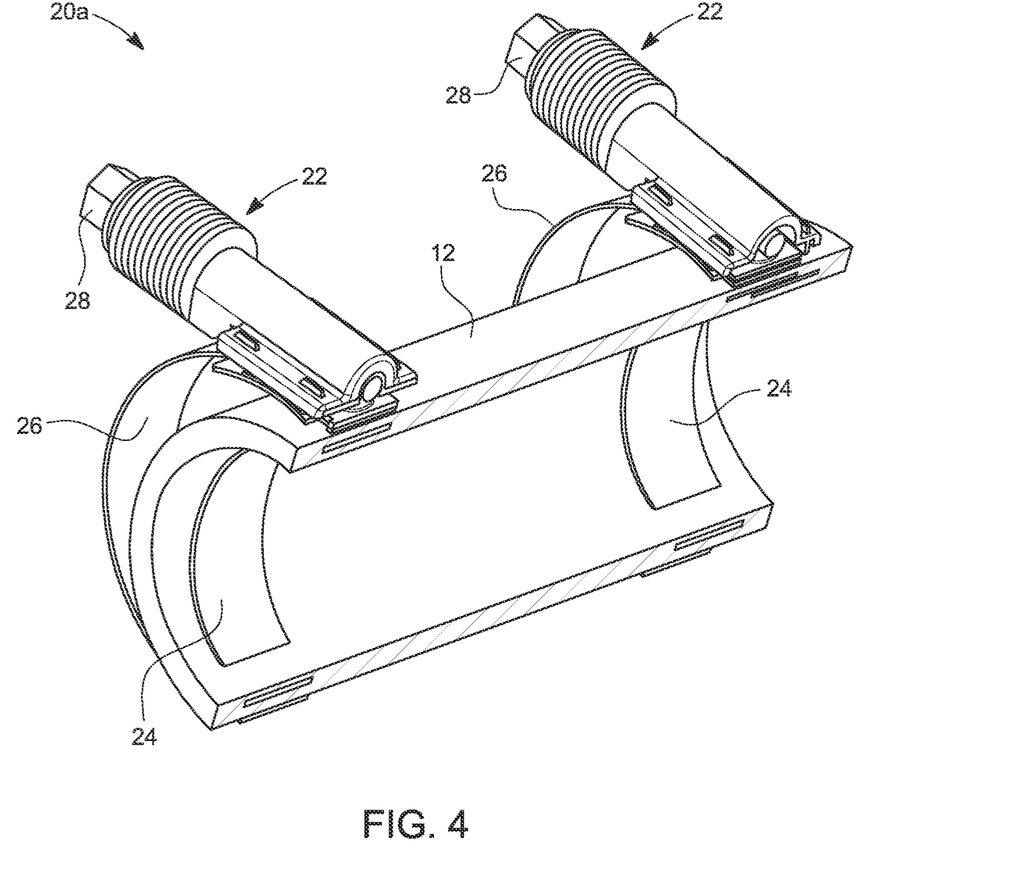
FIG. 4 illustrates how a clamping arrangement may be applied in accordance with at least another exemplary embodiment of the present disclosure.

FIG. 4 illustrates how a clamping arrangement 20a may be applied in accordance with at least another exemplary embodiment of the present disclosure. In this exemplary embodiment, each magnetic strip 24 has been attached to an inner surface of a hose 12. The clamps 22 will still be magnetically attracted by the magnetic strips 24 and become correctly aligned. As can be seen in FIG. 4, each clamp 22 may suitably comprise a band part 26 configured to extend around the hose 12, and a screw part 28 with which the band part 26 may be tightened around the hose 12. Suitably, the band part 26 of each clamp 22 is magnetically attracted by the respective magnetic strip 24. As can be seen in FIG. 4, the width of the band part 26 may substantially correspond to the width of the magnetic strip 24. This may be the case, irrespective of if the magnetic strip 24 is provide on an inner or outer surface of the hose 12 (thus, the corresponding teachings may be applied to the exemplary embodiment in FIGS. 3A and 3B). In addition to the alternatives of providing the magnetic strips 24 on an inner or outer surface of the hose 12, other alternatives are to provide one or more magnetic strips embedded within a material layer of the hose 12 or to sandwich one or more magnetic strips between two material layers of the hose 12.

Figure 5:
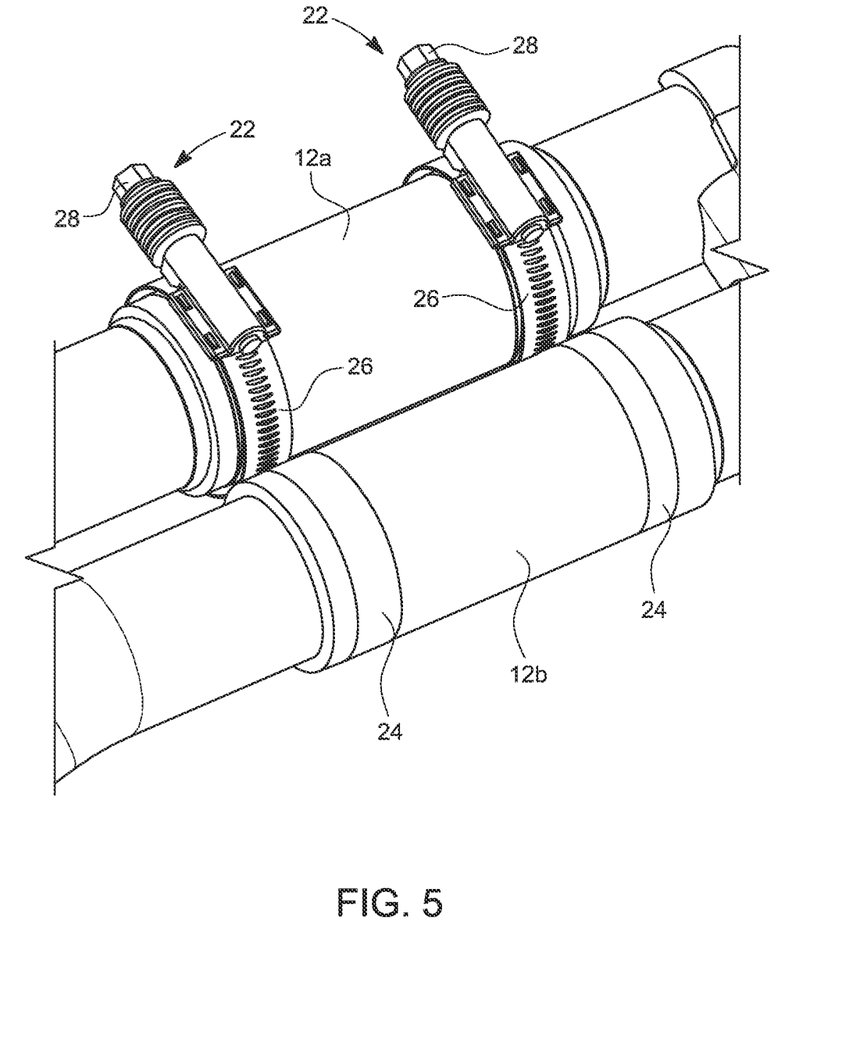
FIG. 5 illustrates a detail of FIG. 3A.

FIG. 5 illustrates a detail of FIG. 3A. For reasons of clarity, the dashed indications have been removed. The various parts discussed in connection with FIG. 4 are clearly visible in FIG. 5 as well. Thus, the magnetic strips 24 have been provided to the hoses 12a, 12b (on their respective outer surface), wherein the magnetic strips 24 on the second hose 12b are clearly visible. Clamps 22 has already been applied to the magnetic strips around the first hose 12a. The clamps 22 comprise a band part 26 aligned with the magnetic strips around the first hose 12a and a screw part 28 which has been turned to tighten the band part 26.

In the exemplary embodiments illustrated in FIGS. 2-5, the two magnetic strips have been illustrated spaced apart from each other, in particular near a respective end of the hose. Nevertheless, it should be understood that the general inventive concept is not limited to the use of two clamps. The method of assembling may also be implemented for just one clamp (for example if some other clamping means is used at another end of the hose or if no additional clamping means is needed).

Figure 6:
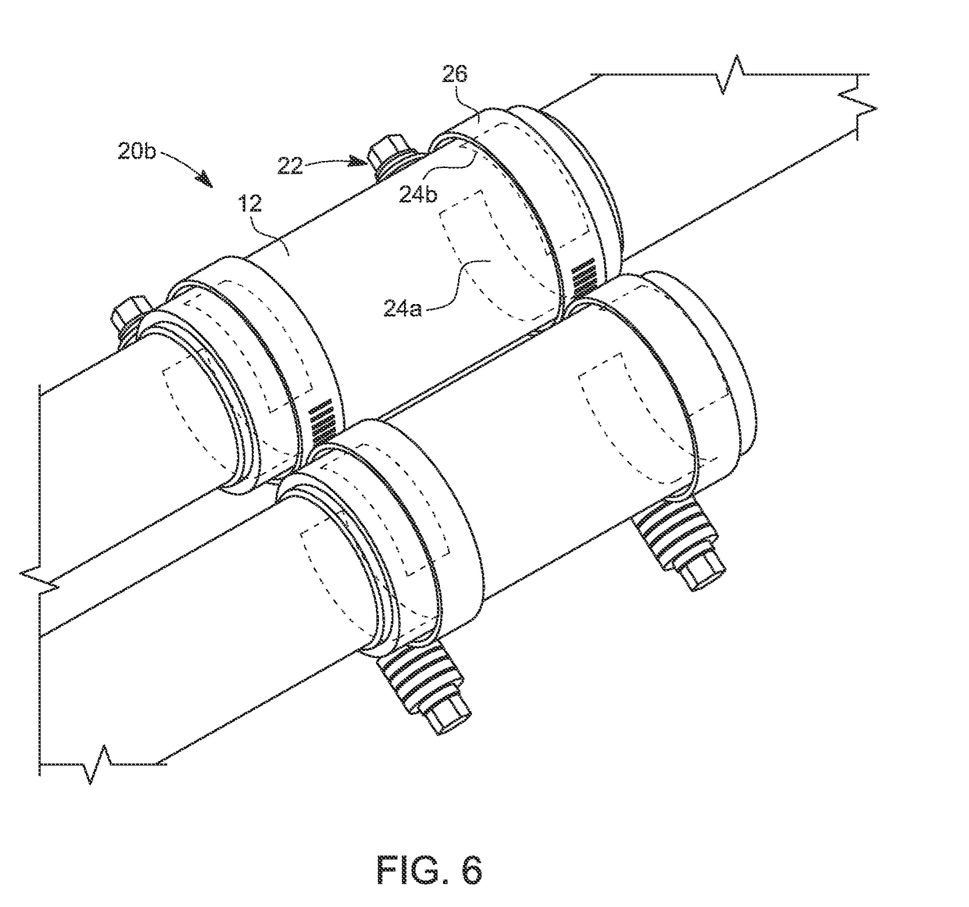
FIG. 6 illustrates how a clamping arrangement may be applied in accordance with yet another exemplary embodiment of the present disclosure.

FIG. 6 illustrates how a clamping arrangement 20b may be applied in accordance with yet another exemplary embodiment of the present disclosure. FIG. 6 illustrates that rather than having one magnetic strip for each clamp, a conceivable alternative may be to provide two or more magnetic strips 24a, 24b for each clamp. More specifically, as illustrated in FIG. 6, the assembling of each clamp 22 involves, providing a hose 12 with a first magnetic strip 24a and at least a second magnet strip 24b (illustrated in dashed lines). Both the first magnetic strip 24a and the second magnetic strip 24b have their respective main direction of extension in the circumferential direction of the hose 12. The first magnetic strip 24a and the second magnetic strip 24b are spaced apart from each other in the circumferential direction of the hose 12. At least a part of each clamp 22, such as a band part 26 as previously discussed, is magnetically attracted by the associated first and second magnetic strips 24a, 24b so that said part of the clamp 22 becomes aligned with the first and the second magnetic strips 24a, 24b along the circumferential direction of the hose 12. By splitting the magnetic strip into several shorter magnetic strips 24a, 24, a higher flexibility is achieved for the hose 12, which may facilitate when mounting the hose 12 to other pipes or any casted parts. This idea of having several shorter magnetic strips may be implemented irrespectively of if the magnetic strips are mounted on the outside of the hose, on the inside of the hose, embedded in a material layer of the hose, or sandwiched between two material layers of the hose.

The invention claimed is:

1. A method of assembling a clamp to a flexible hose for a vehicle, comprising:
   providing the hose with a magnetic strip such that the magnetic strip has its main direction of extension in a circumferential direction of the hose, the hose comprising at least one non-magnetic material layer,
   providing a clamp to the hose, at least a part of the clamp being magnetically attracted by the magnetic strip so that the part of the clamp becomes aligned with the magnetic strip along the circumferential direction of the hose, and
   tightening the clamp to the hose when the clamp has become aligned with the magnetic strip.

2. The method of assembling of claim 1, wherein the step of providing the hose with the magnetic strip comprises sandwiching the magnetic strip between two material layers of the hose, the at least one non-magnetic material layer comprising two material layers.

3. The method of assembling of claim 1, wherein the step of providing the hose with the magnetic strip comprises attaching the magnetic strip to an outer surface of the hose.

4. The method of assembling of claim 1, wherein the step of providing the hose with the magnetic strip comprises attaching the magnetic strip to an inner surface of the hose.

5. The method of assembling of claim 1, wherein the step of providing the hose with the magnetic strip comprises embedding the magnetic strip within the non-magnetic material layer of the hose.

6. The method of assembling of claim 1, wherein the magnetic strip is a first magnetic strip, the method further comprising:
   providing the hose with at least a second magnetic strip such that the second magnetic strip has its main direction of extension in the circumferential direction of the hose and such that the first and the second magnetic strips are spaced apart in the circumferential direction of the hose,
   wherein the step of providing the clamp to the hose comprises the at least a part of the clamp being magnetically attracted by the first and the second magnetic strips so that the part of the clamp becomes aligned with the first and the second magnetic strips along the circumferential direction of the hose.

7. A clamping arrangement, comprising:
   a flexible hose for a vehicle, the hose comprising at least one non-magnetic material layer, and
   a clamp, wherein the clamp comprises a part which is magnetically attractable,
   wherein the hose is provided with a magnetic strip which has its main direction of extension in a circumferential direction of the hose, wherein the part of the clamp is aligned with the magnetic strip along the circumferential direction of the hose, wherein the clamp is tightened to the hose.

8. The clamping arrangement of claim 7, wherein:
the at least one non-magnetic material layer comprises two material layers; and
the magnetic strip is sandwiched between two material layers of the hose.

9. The clamping arrangement of claim 7, wherein the magnetic strip is attached to an outer surface of the hose.

10. The clamping arrangement of claim 7, wherein the magnetic strip is attached to an inner surface of the hose.

11. The clamping arrangement of claim 7, wherein the magnetic strip is embedded within the non-magnetic material layer of the hose.

12. The clamping arrangement of claim 7, wherein the magnetic strip is a first magnetic strip, the clamping arrangement further comprising:
at least a second magnetic strip which has its main direction of extension in the circumferential direction of the hose, wherein the first and the second magnetic strips are spaced apart in the circumferential direction of the hose, and wherein the clamp is aligned with the first and the second magnetic strips along the circumferential direction of the hose.

13. A vehicle comprising the clamping arrangement of claim 7.

14. The clamping arrangement of claim 7,
further comprising a pipe section at least partially inserted into the hose,
wherein the clamp is tightened to the hose around the pipe section.

15. The clamping arrangement of claim 7, wherein the hose joins two pipe sections.

16. The clamping arrangement of claim 7, wherein the non-magnetic material layer comprises a rubber material or a fabric material.

17. The clamping arrangement of claim 7, wherein the part of the clamp is aligned with the magnetic strip along the non-magnetic circumferential direction of the hose.

18. The clamping arrangement of claim 7, wherein the hose on either side of the magnetic strip in the circumferential direction is non-magnetic.

* * * * *